United States Patent [19]

Irwin et al.

[11] 4,204,757
[45] May 27, 1980

[54] FLASH LAMP OPERATING MECHANISM

[75] Inventors: George Irwin; Mark Irwin, both of Highland Park, Ill.

[73] Assignee: Imperial Camera Corp., Chicago, Ill.

[21] Appl. No.: 860,609

[22] Filed: Dec. 14, 1977

[51] Int. Cl.$^2$ ............................................. G03B 15/03
[52] U.S. Cl. .................................................... 354/135
[58] Field of Search ................. 354/135, 129, 34, 230, 354/246, 247, 204; 310/328–330, 333, 339

[56] References Cited

U.S. PATENT DOCUMENTS

| | | | |
|---|---|---|---|
| 3,528,354 | 9/1970 | Nakagawa et al. | 354/135 |
| 3,735,679 | 5/1973 | Winkler | 354/135 X |
| 3,747,491 | 7/1973 | Becker et al. | 354/135 X |
| 3,911,455 | 10/1975 | Ettischer | 354/204 |
| 3,955,205 | 5/1976 | Stoneham | 354/135 |
| 3,958,259 | 5/1976 | Genesky | 354/135 |
| 4,070,685 | 1/1978 | Asker | 354/135 |

FOREIGN PATENT DOCUMENTS

| | | | |
|---|---|---|---|
| 2034576 | 1/1972 | Fed. Rep. of Germany | 354/135 |
| 45-35741 | 11/1970 | Japan | 354/135 |

*Primary Examiner*—L. T. Hix
*Assistant Examiner*—Thomas H. Tarcza
*Attorney, Agent, or Firm*—McDougall, Hersh & Scott

[57] ABSTRACT

A camera construction including a flash mechanism utilizing a generator which is responsive to impact forces. The generator is connected to the flash mechanism, and the generator is provided with an anvil for application of the impact with current being thereby developed to energize the flash mechanism. The impact force is provided by means of a spring loaded striker pin. The pin is automatically moved to a cocked position in conjunction with the cocking of the camera shutter mechanism. The pin is then automatically released and driven against the anvil upon actuation of the shutter mechanism during the picture taking operation. This provides a flash in synchronism with the operation of the shutter mechanism so that the flash will be effective during the film exposure.

5 Claims, 10 Drawing Figures

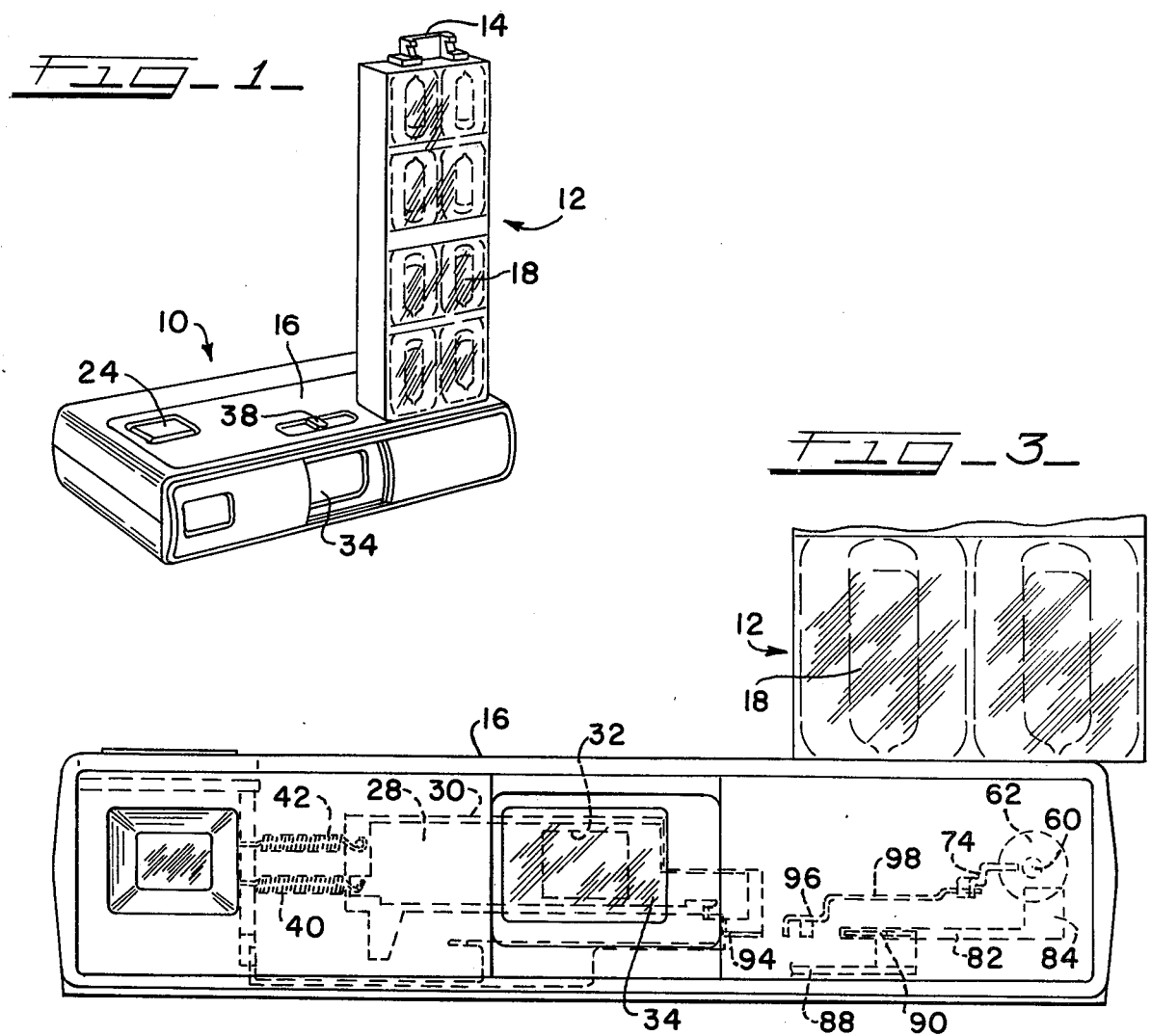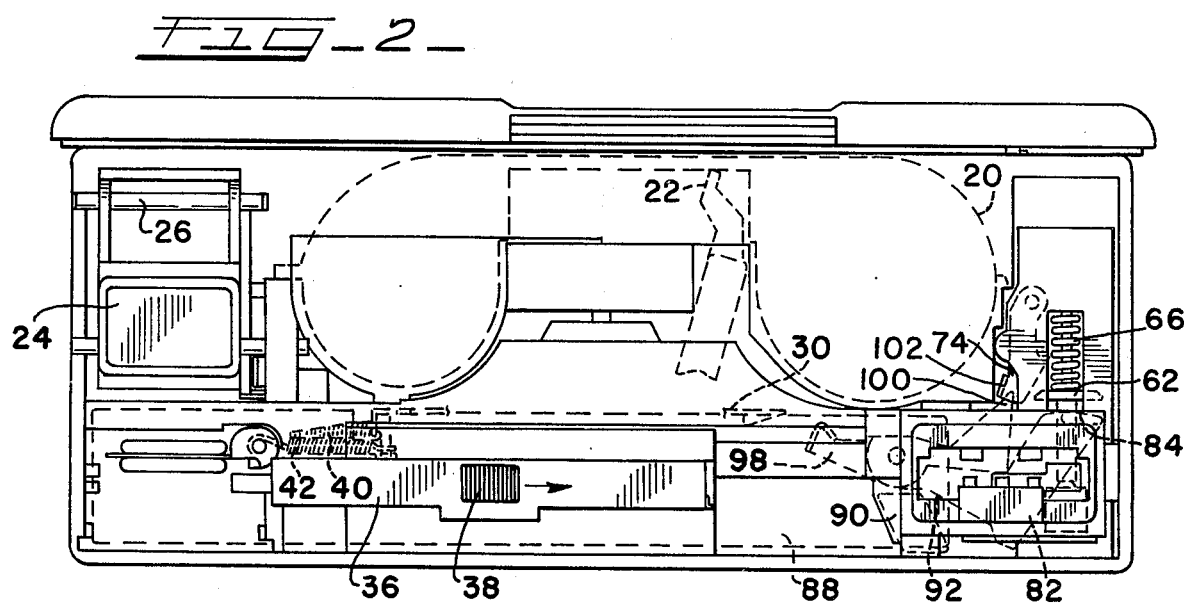

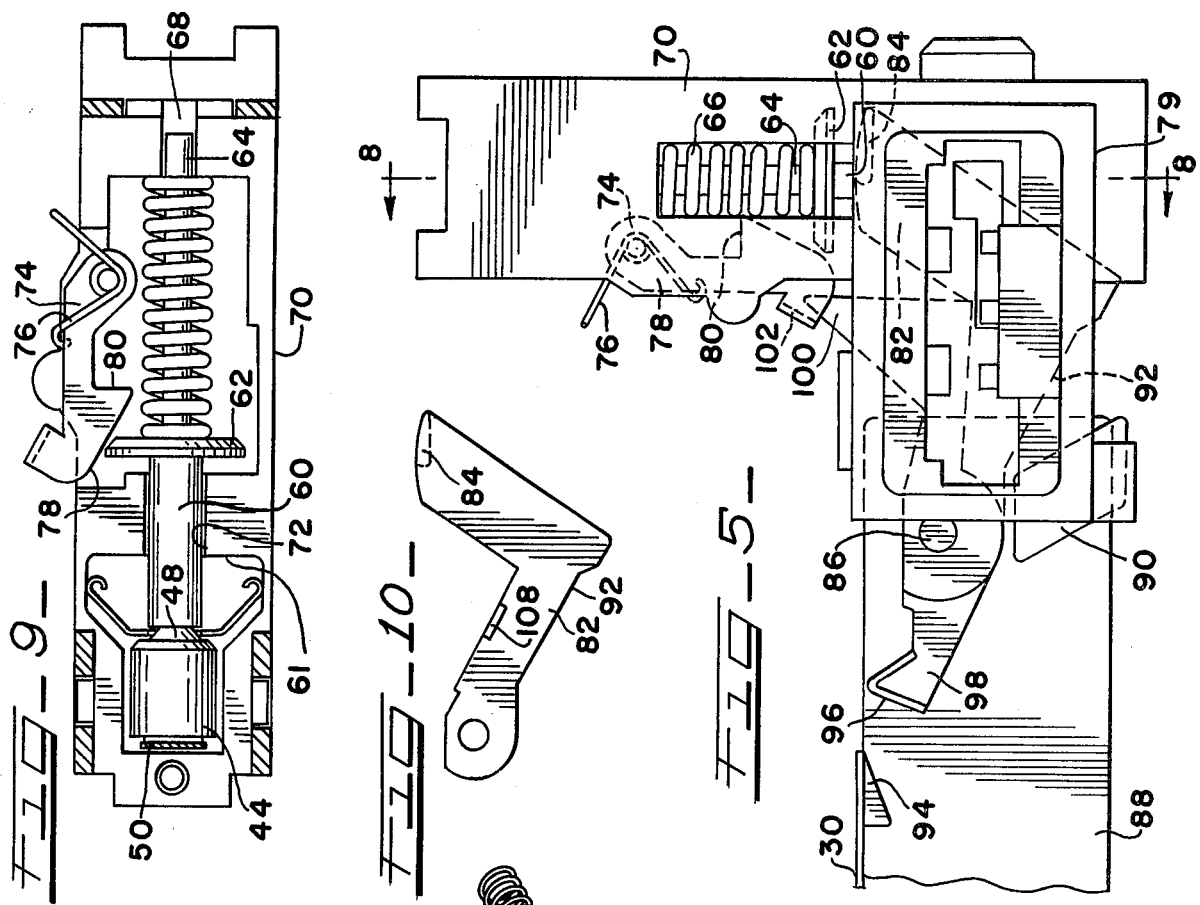

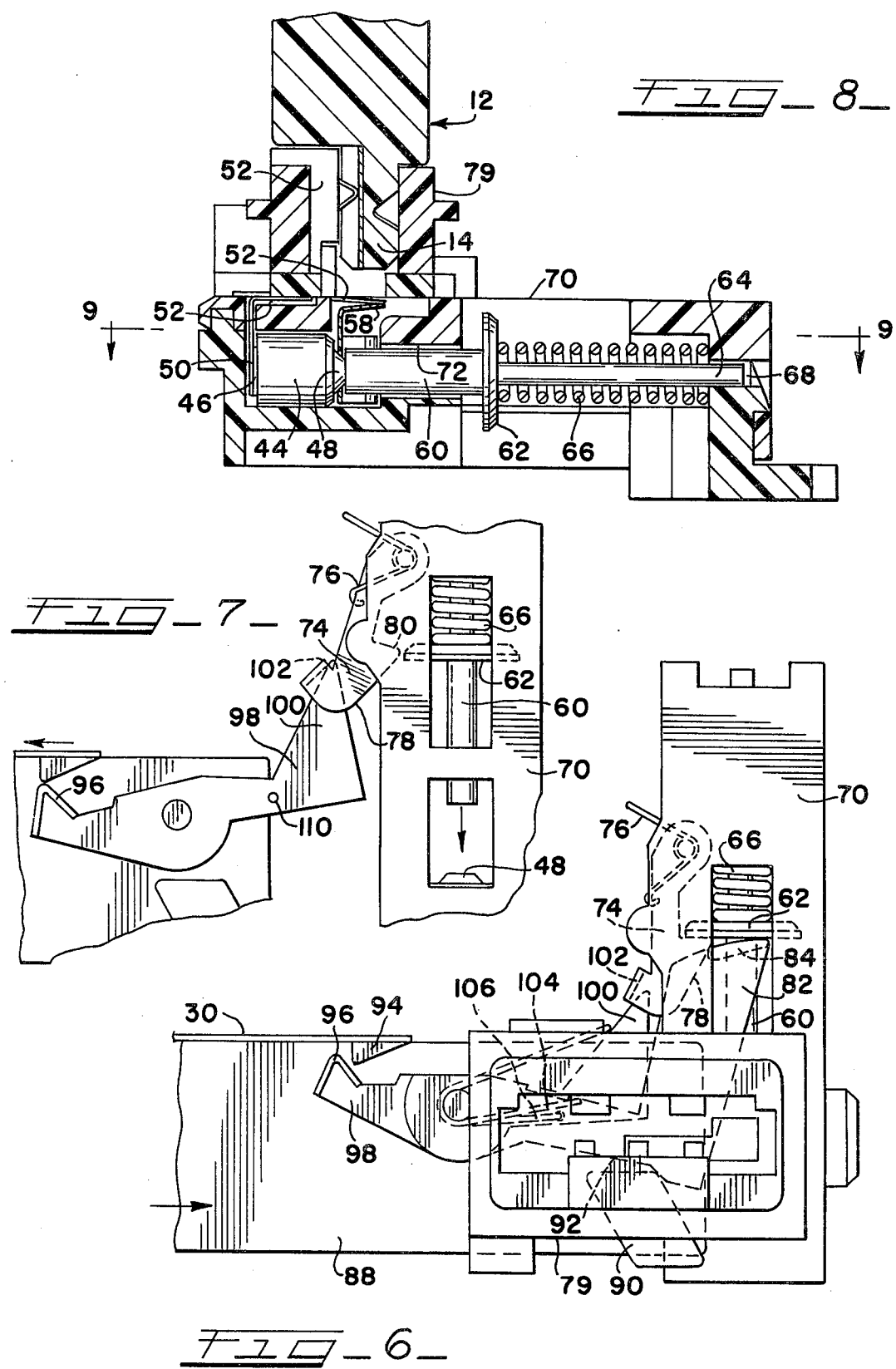

FLASH LAMP OPERATING MECHANISM

BACKGROUND OF THE INVENTION

This invention relates to cameras particularly of the type employed for taking still pictures. Such cameras include mechanisms for exposing film, usually in a frame-by-frame fashion, the film comprising a roll and the camera including a mechanism for advancing the roll. The invention is particularly concerned with flash mechanisms of the type employed in conjunction with such cameras to that natural light, if any, can be supplemented by artificial light to achieve sufficient light for picture taking purposes.

Various flash mechanisms have been developed including mechanisms which rely upon momentary electrical current for operating a flash bulb or the like. A popular system involves the use of batteries for supplying the electrical current; however, such systems are inconvenient due to the limited life of the batteries.

Piezoelectric generating means have also been proposed for use in association with camera flash mechanisms. A very small piezoelectric ceramic cube is located within a camera housing, and a hammer mechanism is employed for striking the cube. By synchronizing the hammer operation with the shutter operation of the camera, a brief current pulse is achieved when the film is exposed. Leads connected between a flash bulb and the cube provide the means for igniting the flash bulb in response to the current pulse.

BRIEF SUMMARY OF THE INVENTION

In accordance with this invention, highly efficient means are provided for developing electrical current pulses in a system utilizing piezoelectric ceramic cubes. The invention is particularly concerned with striker means which are employed for imparting impact forces to the cubes.

The invention particularly involves the utilization of a spring-loaded striker pin. Drive means are connected to the camera shutter mechanisms, and these drive means engage the pin to drive the pin to a cocked position. A catch mechanism holds the pin in the cocked position until operation of the shutter release button of the camera. This button is also preferably operatively connected to the shutter mechanism with the shutter mechanism releasing the catch whereby the spring loaded pin is driven against the anvil associated with the piezoelectric cube. In this fashion, the film exposure is efficiently synchronized with the flash which develops in response to the generation of a current pulse by the cube. The particular striker pin design is such that the desired impact force will be reliably imparted to the piezoelectric cube for a very high number of operating cycles. Thus, the means of this invention will have an operating life commensurate with the expected life of the piezoelectric cube and other camera mechanisms.

BRIEF DESCRIPTION OF THE DRAWINGS

FIG. 1 is a perspective view of a camera construction and flash lamp assembly of the type suitable for use in conjunction with the mechanisms of this invention;

FIG. 2 is a plan view of the camera with a cover portion removed;

FIG. 3 is a front elevational view of the camera;

FIG. 4 is an exploded view illustrating parts of the piezoelectric cube mounting and striking mechanisms;

FIG. 5 is a fragmentary assembly view of the mounting and striking mechanisms;

FIG. 6 is an assembly view of the mechanism shown in FIG. 5 in the cocked position;

FIG. 7 is a fragmentary view of the mechanisms after release of the striker pin;

FIG. 8 is a vertical cross-sectional view taken about the line 8—8 of FIG. 5;

FIG. 9 is a horizontal cross-sectional view taken about the line 9—9 of FIG. 8; and, FIG. 10 is a detailed view of a cocking lever utilized in the construction.

DETAILED DESCRIPTION OF THE INVENTION

FIG. 1 of the drawings illustrates a camera 10 having a flash mechanism 12 associated therewith. This mechanism comprises a so-called "Flip Flash" device of the type manufactured by the General Electric Company. The device includes upper and lower contact portions 14 which are adapted to be inserted into an opening in the wall 16 of the camera for contact with terminals. When current pulses are developed, the individual bulbs 18 will flash in sequence. The mechanism is designed so that one or more bulbs will flash in sequence when the mechanism is located in the position shown, and the lamp array is then inverted for engagement of the other contact portion with the terminals so that the other bulbs can be operated in sequence.

This invention is directed to means for developing the contact pulses. It will be understod that the flash mechanism illustrated is provided only as an example of the type of mechanism which could be energized by such current pulses.

As shown in FIG. 2, the camera 10 is adapted to be used in association with a film magazine 20. The film in this magazine defines spaced apart perforations, and a sensing finger 22 is adapted to be received by said perforations. Film drive means in combination with the sensing finger operate to locate the individual film frames in picture taking position.

The camera illustrated also includes a shutter button 24 which is mounted for pivoting movement about shaft 26. The button is adapted to operate shutter mechanisms which include blades 28 and 30. These blades define apertures as shown at 32, and when the respective blade apertures are in alignment with each other and in alignment with lens 34, a film frame will be exposed.

The mechanisms for setting and releasing the shutter blades are well-known and do not form a part of this invention. For purposes of this invention, it is sufficient to note that the blades are driven by member 36 which includes a finger button 38. In the standard sequence of operations, movement of the member 36 in the direction of the arrow shown in FIG. 2 will drive the blades in opposition to springs 40 and 42. The sequence of this driving movement is such that the apertures of the blades are driven past the lens 34; however, the apertures and lens are never in alignment so that there is no exposure of film. Latching means are provided for holding the blades in position with the springs 40 and 42 extended. The member 36 also serves to drive the film in the magazine so that a new unexposed frame is positioned behind the lens when the blades are latched.

Also in accordance with standard mechanisms, depressing of the shutter button 24 operates to delatch the blades whereby the springs 40 and 42 move the blades rapidly relative to the lens. The sequence of this movement is such that the blade apertures are aligned with each other when passing the lens so that the film exposure will occur.

FIGS. 4 through 10 illustrate the structure of the invention employed for developing current pulses. As illustrated, this structure includes means supporting a housing 44 for a piezoelectric crystal. This structure includes a first contact portion 46 and a second contact portion 48, the latter comprising the anvil which receives impact forces.

The contact portion 46 is positioned in engagement with terminal blade 50. This blade includes a right angle portion which extends into engagement with contact 52, the latter contacting the contact portion 14 of the flash mechanism.

A second terminal element 54 defines an opening 56 for receiving the anvil 48 and for providing electrical contact with the anvil. The arm 58 of the terminal element 54 extends into engagement with another contact 52 which, in turn, engages the contact portion 14 of the flash mechanism. The provision of the terminal elements 50 and 54 thus provides the means for completing a circuit which includes a flash bulb and the piezoelectric crystal when impact forces are developed.

Element 54 also includes spring fingers 59 which engage the interior wall 61 of housing section 70. The element 54 thus also serves as a retainer for crystal housing 44.

In accordance with this invention, a striker pin 60 is adapted to engage anvil 48. This pin carries an annular rim 62 and an additional pin section 64, the latter supporting spring 66. As best shown in FIG. 9, the striker pin 60 is normally held in engagement with the anvil 48 with the pin section 64 being received within opening 68 of housing section 70. A similar slotted opening 72 is provided for receiving striker pin section 60, and this combination provides a means for holding the pin in alignment relative to housing section 70. An additional section 71 of the housing defines openings 73 and 75 for engagement with shoulders 77 defined by the housing section 70. This provides a means for locking the striker pin and associated elements in assembly.

Additional housing section 79 is provided for supporting the contact engageable with contact portions 14 of the flash mechanism. This section 79, in particular, supports contacts 52 which are engageable with the terminal blades 50 and 54. It will be appreciated that the particular means for conducting the electrical pulses to the contact portions 14 of the flash mechanisms do not form a part of the invention and may be selected in accordance with already existing structures.

A pivotally mounted latch 74 is carried by the housing section 70. Spring 76 normally maintains the latch in the latching position. Cam surface 78 defined by the latch is normally in the path of annular rim 62 whereby movement of the striker pin will operate to pivot the latch in opposition to the spring 76. When the rim 62 moves beyond the surface 78, shoulder 80 engages the underside of the rim whereby the striker pin is adapted to be held in the cocked position as shown in FIG. 6.

The cocking lever 82 shown in FIG. 10 provides the means for driving the striker pin to the cocked position. The lever 82 includes a lip 84 which extends inwardly beneath the rim 62. The lever is mounted for pivoting movement about pin 86, and as shown in FIGS. 5 and 6, pivoting of the lever operates to move the striker pin from its extended position to its cocked position.

The drive member 36 includes a section 88 particularly shown in FIGS. 2, 3 and 5. A drive arm 90 is formed at the end of the section 88, and this arm is positioned in line with cam surface 92 defined by lever 82. Accordingly, when the drive member 36 is operated to advance the film, the arm 90 engages the cam surface 92 to drive the lever 82. This action operates to cock the striker pin 60.

As previously noted, the drive member 36 is also operatively connected to shutter blades 28 and 30. A drive element 94 is formed on the shutter blade 30, and this drive element moves in a path occupied by engaging surface 96 of a lever 98. The lever 98 is supported on shaft 86 along with the lever 82.

The lever 98 defines an end 100 which is engageable with the latch 78. This latch specifically defines an engaging portion 102 which, as shown in FIGS. 5 through 7, is located within the path movement of the end 100 during pivoting movement of lever 98.

In describing the operation of the construction, it will be assumed that a picture has been taken with the shutter blades disposed in the position of FIGS. 2 and 3 and with the striker pin 60 in the extended position. In order to prepare for the next picture taking operation, the finger button 38 is engaged for driving of the member 36 from left to right. This operates to move the shutter blades 28 and 30 into a latched position. At the same time, the portion 88 of the member 36 moves from the position shown in FIG. 5 to the position shown in FIG. 6 whereby the striker pin is driven to a cocked position. The element 94 associated with blade 30 will at the same time move past the engaging portion 96 of the lever 98. In this connection, it will be noted that a pair of springs 104 and 106 are provided for normally forcing the levers 82 and 98 in a clockwise direction. Accordingly, the driving action imparted to these levers is in opposition to these springs, and the levers automatically return to the positions shown in FIG. 5 when enagagement with driving members is removed. Lip 108 on lever 82 and opening 110 on lever 98 provide the means for holding the springs in engagement with the levers.

Operation of the drive member 36 for purposes of advancing the film and for moving the shutter blades to the latched position will thus automatically move the striker pin to a cocked position. When the shutter button 24 is depressed, the blades 28 and 30 are automatically released. This results in the engagement of member 94 with the engaging portion 96 of lever 98 so that the end 100 of this lever will be driven against the portion 102 of the catch 78. This moves the catch to the position of FIG. 7 whereby the striker pin is released and driven against anvil 48.

The operation described achieves impact of the striker pin with the anvil 48 in synchronized relationship with the movement of the shutter blades. Accordingly, the apertures in the shutter blades can be readily aligned with the lens in synchronism with the current pulse developed by the piezoelectric crystal. This provides a highly effective means for insuring that the peak light developed by a flash bulb will be developed while the film is exposed to provide the most efficient picture taking capability. Thus, the system of this invention provides a mechanical means which can be readily designed to achieve the most efficient picture taking operation.

It will also be appreciated that a relatively simple mechanical movements and design criteria are involved. Thus, the structure of the invention, and in particular the striker pin which is confined to movement on the axis occupied by the crystal anvil, is of a highly reliable nature. Moreover, it has been found that the striker pin design provides a highly uniform signal generating pressure which contributes greatly to its reliability over an extended period.

It will be understood that various changes and modifications may be made in the above described construction which provide the characteristics thereof without departing from the spirit therof particularly as defined in the following claims.

That which is claimed is:

1. In a camera construction having a shutter mechanism, a flash mechanism, and a generator responsive to impact forces for energizing the flash mechanism, the generator including an anvil for application of the impact, impact initiating and applying means, a catch for holding the impact means in a cocked position, and spring means normally urging said pin toward said anvil, the improvement wherein said impact means comprises a reciprocally movable striker pin, a rim portion defined by said striker pin, said catch being movable into engagement with said rim portion to hold the striker pin in a cocked position, said shutter mechanism including reciprocally movable drive means, a cocking lever for said striker pin, said drive means engaging said cocking lever when the shutter mechanism is moved into position prior to a picture taking operation whereby the cocking lever moves the striker pin to a cocked position in response to movement of the drive means by the shutter mechanism, the axis of said striker pin being coincident with the axis of said generator whereby said striker pin is movable in a path coincident with the axis of said generator, the drive means driving the pin in opposition to said spring means, and a catch-release lever, said release lever having one end portion engageable with said catch, a second end portion of the release lever engageable with said drive means, and wherein operation of the shutter mechanism during a picture taking operation causes said drive means to move said release lever against said catch whereby said catch releases said striker pin.

2. A construction in accordance with claim 1 wherein said generator comprises a piezoelectric crystal.

3. A construction in accordance with claim 2 wherein said crystal is supported in a housing, and means defined by said housing for supporting said striker pin and for maintaining the path of movement of the striker pin in alignment with said crystal.

4. A construction in accordance with claim 1 wherein said generator is supported in a housing, and means defined by said housing for supporting said striker pin and for maintaining the axis of the striker pin in alignment with the axis of said generator.

5. A construction in accordance with claim 4 wherein said striker pin defines means for engagement with one end of said spring means, means defined by said housing for engaging the other end of said spring means, and wherein said spring means is removable from engagement with said striker pin and said housing.

* * * * *